United States Patent
Suzuki (10) Patent No.: US 11,535,083 B2
(45) Date of Patent: Dec. 27, 2022

(54) INSPECTION SYSTEM

(71) Applicant: SUBARU CORPORATION, Tokyo (JP)

(72) Inventor: Mototsugu Suzuki, Lafayette, IN (US)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/207,049

(22) Filed: Mar. 19, 2021

(65) Prior Publication Data

US 2022/0297503 A1 Sep. 22, 2022

(51) Int. Cl.
*B60H 1/00* (2006.01)
*H04N 5/33* (2006.01)

(52) U.S. Cl.
CPC ..... *B60H 1/00807* (2013.01); *B60H 1/00792* (2013.01); *B60H 1/00878* (2013.01); *H04N 5/33* (2013.01)

(58) Field of Classification Search
CPC ........... B60H 1/00285; B60H 1/00807; B60H 1/00792; B60H 1/00878; B60N 2/5685; B60N 2/5678; B60N 2/56; B60N 2/5692; B60R 21/0154
See application file for complete search history.

(56) References Cited

U.S. PATENT DOCUMENTS

| | | | | |
|---|---|---|---|---|
| 2010/0130808 A1* | 5/2010 | Hattori | ................. | B60N 2/5685 219/202 |
| 2013/0232996 A1* | 9/2013 | Goenka | ............. | B60H 1/00742 62/3.61 |
| 2016/0046174 A1* | 2/2016 | Sagou | ....................... | H05B 3/12 219/202 |
| 2016/0354027 A1* | 12/2016 | Benson | ................. | A61B 5/1102 |
| 2018/0207691 A1* | 7/2018 | Byrne | ....................... | B60S 1/46 |
| 2018/0319299 A1* | 11/2018 | Dudar | .................. | B60N 2/5692 |
| 2020/0093635 A1* | 3/2020 | Kakizaki | .............. | B60N 2/5678 |
| 2020/0164899 A1* | 5/2020 | Yasui | ..................... | G06Q 50/30 |
| 2020/0223292 A1* | 7/2020 | Kazyak | .............. | B60H 1/00292 |
| 2020/0324614 A1* | 10/2020 | Hiramatsu | ......... | B60H 1/00742 |
| 2021/0245771 A1* | 8/2021 | Golov | ....................... | G06N 3/08 |
| 2022/0063569 A1* | 3/2022 | Herman | ............... | B60N 2/5678 |

FOREIGN PATENT DOCUMENTS

JP 2006-271447 A 10/2006

* cited by examiner

*Primary Examiner* — Nelson J Nieves
(74) *Attorney, Agent, or Firm* — McDermott Will & Emery LLP (57) ABSTRACT

An inspection system includes a thermal camera and an inspection processor. The thermal camera is mountable on a vehicle and configured to perform imaging of a heat transfer part of heating and cooling equipment mounted on the vehicle. The inspection processor is configured to execute, after causing the heating and cooling equipment to start operation, operation check inspection of determining whether the heating and cooling equipment normally operates on the basis of an image of the heat transfer part obtained by the imaging by the thermal camera, and to, in executing the operation check inspection, perform a modification process of modifying an imaging state of the thermal camera to enable the heat transfer part to be imaged by the thermal camera.

6 Claims, 4 Drawing Sheets

INSPECTION SYSTEM

BACKGROUND

The technology relates to an inspection system for a vehicle.

For example, Japanese Unexamined Patent Application Publication (JP-A) No. 2006-271447 discloses a technique of detecting a temperature of a seat heater provided in a seat of a vehicle, by a seat heater temperature sensor disposed near the seat heater.

SUMMARY

An aspect of the technology provides an inspection system including a thermal camera and an inspection processor. The thermal camera is mountable on a vehicle and configured to perform imaging of a heat transfer part of heating and cooling equipment mounted on the vehicle. The inspection processor is configured to execute, after causing the heating and cooling equipment to start operation, operation check inspection of determining whether the heating and cooling equipment normally operates on the basis of an image of the heat transfer part obtained by the imaging by the thermal camera, and to, in executing the operation check inspection, perform a modification process of modifying an imaging state of the thermal camera to enable the heat transfer part to be imaged by the thermal camera.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

A vehicle is mounted with a plurality of pieces of heating and cooling equipment that intentionally increases or reduces temperature, such as a seat heater. In a case of inspecting the plurality of pieces of heating and cooling equipment, the technique disclosed in JP-A No. 2006-271447 demands that a temperature sensor be provided for each piece of heating and cooling equipment. It therefore takes time and labor to install the temperature sensors, which can make the inspection complicated.

It is desirable to provide an inspection system that makes it possible to easily perform inspection of vehicle-mounted heating and cooling equipment.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, a dimension of each of the elements, a material of each of the elements, the number of each of the elements, the shape of each of the elements, a size of each of the elements, a ratio between the elements, relative positional relationship between the elements, and any other specific numeral value related to each of the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

[First Example Embodiment]

Figure 1:
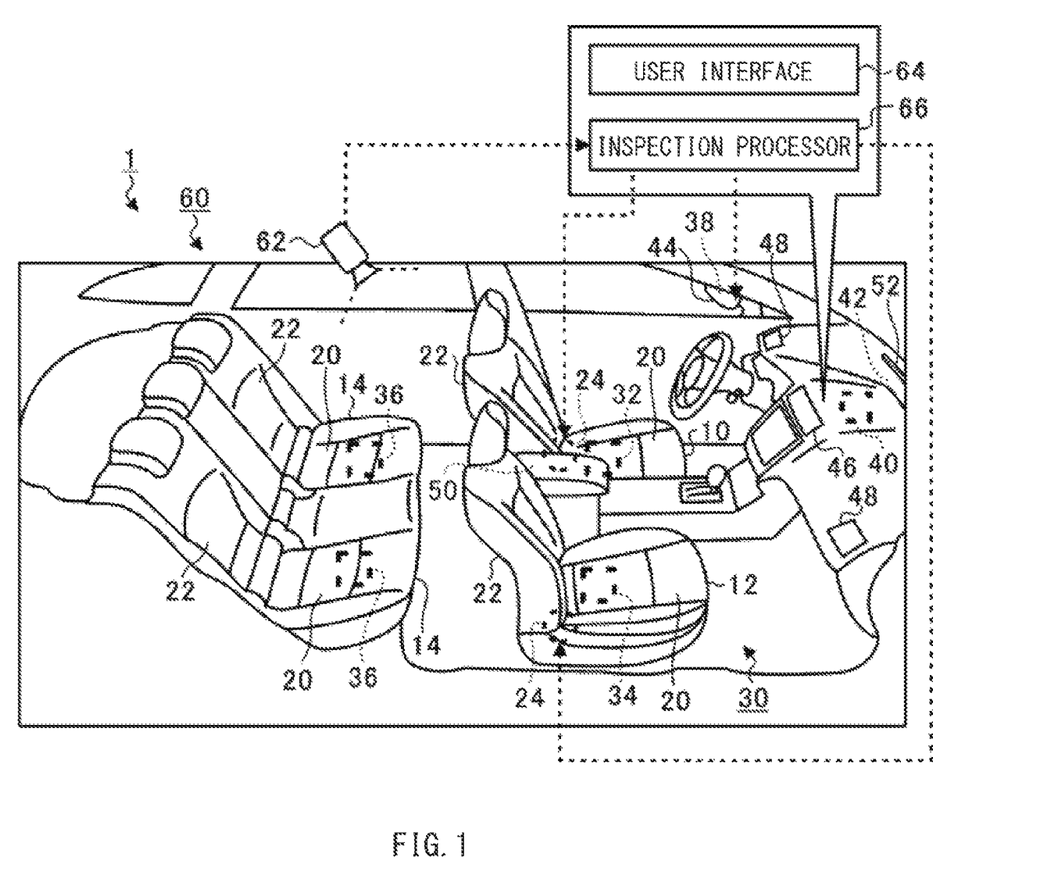
FIG. 1 is a schematic diagram illustrating a configuration of a vehicle according to one example embodiment.

FIG. 1 is a schematic diagram illustrating a configuration of a vehicle 1 according to a first example embodiment. The vehicle 1 may be an engine vehicle, an electric vehicle, or a hybrid electric vehicle. The vehicle 1 may have a vehicle compartment in which a driver's seat 10, a passenger seat 12, and rear seats 14 are mounted. Hereinafter, the driver's seat 10, the passenger seat 12, and the rear seats 14 may be collectively and simply referred to as seats.

The driver's seat 10 may be disposed to be opposed to a steering wheel. The passenger seat 12 may be disposed next to the driver's seat 10. The driver's seat 10 and the passenger seat 12 may be configured independently of each other. The driver's seat 10 and the passenger seat 12 may be collectively referred to as front seats.

The rear seats 14 may be disposed behind the driver's seat 10 and the passenger seat 12. The rear seats 14 may include two portions, i.e., a portion positioned in the rear of the driver's seat 10 and a portion positioned in the rear of the passenger seat 12, coupled to and integrated with each other. Two rows of seats may thus be provided in a front-rear direction of the vehicle 1. Without being limited to two rows, three or more rows of seats may be provided. Of the rear seats 14, the portion positioned in the rear of the driver's seat 10 and the portion positioned in the rear of the passenger seat 12 may be separated.

Each of the seats may include a seat part 20 and a backrest 22. The seat part 20 may be supported by a floor of the vehicle compartment to extend in the front-rear direction and a left-right direction of the vehicle 1. The backrest 22 may be joined to a rear part of the seat part 20 to extend upward from the seat part 20. An occupant may be seated on the seat part 20. The backrest 22 may support a back of the occupant.

Each of the front seats may contain an actuator 24. The backrest 22 of each of the front seats may be swingable, by the actuator 24, about its joint with the seat part 20. While the vehicle 1 is being driven, the backrest 22 may be in a standing state of standing upward from the seat part 20, as illustrated as an example in FIG. 1. The actuator 24 may be configured to tilt the backrest 22 rearward, in response to a predetermined instruction or operation. The actuator 24 may also be configured to return the tilted backrest 22 to the standing state.

The vehicle 1 may be mounted with heating and cooling equipment 30 that intentionally changes temperature. The heating and cooling equipment 30 may be provided to make an environment in the vehicle compartment or a driving environment comfortable. In one example, the heating and cooling equipment 30 may be a driver's seat heater 32, a passenger seat heater 34, a rear seat heater 36, a side mirror heater 38, an air conditioner 40, and a defroster 42. Without being limited to these examples, the heating and cooling equipment 30 may include any equipment that increases or reduces temperature.

The driver's seat heater 32 may be contained in the seat part 20 of the driver's seat 10. The driver's seat heater 32 may heat the seat part 20 of the driver's seat 10. Accordingly, the seat part 20 of the driver's seat 10 may be a heat transfer part to which heat of the driver's seat heater 32 is to be transferred. The passenger seat heater 34 may be contained in the seat part 20 of the passenger seat 12. The passenger seat heater 34 may heat the seat part 20 of the passenger seat 12. Accordingly, the seat part 20 of the passenger seat 12 may be a heat transfer part to which heat of the passenger seat heater 34 is to be transferred. Hereinafter, the driver's seat heater 32 and the passenger seat heater 34 may be referred to as front seat heaters.

The rear seat heater 36 may be contained in each of two portions, i.e., the seat part 20 of the portion, of the rear seats 14, positioned in the rear of the driver's seat 10, and the seat part 20 of the portion, of the rear seats 14, positioned in the rear of the passenger seat 12. The rear seat heater 36 may heat the seat part 20 of each of the rear seats 14. Accordingly, the seat part 20 of each of the rear seats 14 may be a heat transfer part to which heat of the rear seat heater 36 is to be transferred.

The side mirror heater 38 may be contained in a side mirror 44. The side mirror heater 38 may heat the side mirror 44 to defog the side mirror 44. Accordingly, the side mirror 44 may be a heat transfer part to which heat of the side mirror heater 38 is to be transferred. The side mirror 44 may be openable and closable with respect to a body of the vehicle 1 (hereinafter also referred to as a "vehicle body"), by an actuator contained in the side mirror 44.

The air conditioner 40 may be provided inside the vehicle body, and may include a heat exchanger that generates warm air or cool air. The air conditioner 40 may be coupled to a front center air outlet 46, a front side air outlet 48, and a rear center air outlet 50. The front center air outlet 46 may be provided in the middle of a front panel. The front side air outlet 48 may be provided on each of the driver's seat side and the passenger seat side of the front panel. The front center air outlet 46 and the front side air outlet 48 may blow the warm air or cool air generated by the air conditioner 40 toward the front seats. The rear center air outlet 50 may be provided between the driver's seat 10 and the passenger seat 12. The rear center air outlet 50 may blow the warm air or cool air generated by the air conditioner 40 toward the rear seats 14. Accordingly, the front center air outlet 46, the front side air outlet 48, and the rear center air outlet 50 may be a heat transfer part to which heat generated by the air conditioner 40 is to be transferred. Note that the front center air outlet 46, the front side air outlet 48, and the rear center air outlet 50 may be coupled to different air conditioners 40.

The defroster 42 may be provided inside the vehicle body, and may include a heat exchanger that generates warm air. The defroster 42 may be coupled to a defroster air outlet 52. The defroster air outlet 52 may be provided, near a front windshield, on the front panel. The defroster air outlet 52 may blow the warm air generated by the defroster 42 to the front windshield to defog the front windshield. Accordingly, the defroster air outlet 52 may be a heat transfer part to which heat generated by the defroster 42 is to be transferred.

An inspection system 60 may be applied to the vehicle 1. The inspection system 60 may inspect whether the vehicle-mounted heating and cooling equipment 30 normally operates, as will be described later. The inspection system 60 may be used, for example, in an inspection process during manufacture of the vehicle 1, during maintenance after sale of the vehicle 1, or during regular vehicle inspection. The inspection system 60 may include a thermal camera 62, a user interface 64, and an inspection processor 66.

The thermal camera 62 may be installed in the vehicle compartment. For example, the thermal camera 62 may be disposed on a ceiling of the vehicle compartment. In one example, the thermal camera 62 may be positioned above the seat parts 20 of the rear seats 14. The thermal camera 62 may be disposed in the middle in the left-right direction of the vehicle compartment. The thermal camera 62 may be disposed to face diagonally forward and downward, as illustrated in FIG. 1. The thermal camera 62 may be disposed such that its field of view includes the heating and cooling equipment 30 described above.

The thermal camera 62 may be provided together at a position where a child presence detection camera is disposed. The child presence detection camera may capture an image of a child seated on the rear seats 14, to prevent the child from being left when the occupant leaves the vehicle. In a case where the child presence detection camera is configured to serve as the thermal camera 62, the child presence detection camera may be used as the thermal camera 62 of the inspection system 60.

The thermal camera 62 may be disposed at a position of a center room lamp on the ceiling. In a case where the ceiling is provided with a sunroof, the thermal camera 62 may be disposed at a position of a side room lamp positioned above a rear door.

The thermal camera 62 may include a temperature transducer configured to detect a surface temperature of an object. The thermal camera 62 may generate an image indicating temperature distribution of an imaged object. In one example, the thermal camera 62 performs imaging of a heat transfer part of the vehicle-mounted heating and cooling equipment 30, to generate an image including temperature information of the imaged heat transfer part.

The user interface 64 may be configured to assist an input operation for, for example, various settings related to the inspection. The user interface 64 may also be configured to display an inspection result on a display. For example, a vehicle-mounted navigation system may be used as the user interface 64.

The inspection processor 66 may be a computer configured by a semiconductor integrated circuit that includes, without limitation, a central processing unit (CPU), a read-only memory (ROM), and a random-access memory (RAM). The ROM may hold, for example, a program. The RAM may serve as a working area. The inspection processor 66 may cooperate with the program to implement operation related to the inspection. In one embodiment, the inspection processor 66 may serve as an "inspection processor".

The inspection processor 66 may cause the heating and cooling equipment 30 to start operation, in response to an inspection start instruction inputted via the user interface 64. The inspection processor 66 executes operation check inspection of determining whether the heating and cooling equipment 30 normally operates, on the basis of the image of the heat transfer part of the heating and cooling equipment 30 obtained by the imaging (i.e., captured) by the thermal camera 62.

For example, in a case where a predetermined temperature is reached within a predetermined time period from the start of the operation of the heating and cooling equipment 30, the inspection processor 66 may determine that the heating and cooling equipment 30 normally operates, i.e., that the inspection is passed. In a case where the predetermined temperature is not reached within the predetermined time period from the start of the operation of the heating and cooling equipment 30, the inspection processor 66 may determine that the heating and cooling equipment 30 does not normally operate, i.e., that the inspection is failed.

The inspection processor 66 also performs, in executing the operation check inspection, a modification process of modifying an imaging state to enable the heat transfer part to be imaged by the thermal camera 62.

For example, the inspection processor 66 may cause, as the modification process, an obstacle between the thermal camera 62 and the heat transfer part to be moved in a direction that prevents the imaging by the thermal camera 62 from being obstructed.

In one example, as illustrated in FIG. 1, the backrest 22 of the driver's seat 10 may be present between the thermal camera 62 and the seat part 20 of the driver's seat 10, which is the heat transfer part of the driver's seat heater 32. Therefore, the backrest 22 of the driver's seat 10 can obstruct the imaging of the seat part 20 of the driver's seat 10 by the thermal camera 62. Hence, the inspection processor 66 may cause the actuator 24 of the driver's seat 10 to tilt the backrest 22 of the driver's seat 10 rearward. Similarly, the backrest 22 of the passenger seat 12 may be present between the thermal camera 62 and the seat part 20 of the passenger seat 12, which is the heat transfer part of the passenger seat heater 34. Therefore, the backrest 22 of the passenger seat 12 can obstruct the imaging of the seat part 20 of the passenger seat 12 by the thermal camera 62. Hence, the inspection processor 66 may cause the actuator 24 of the passenger seat 12 to tilt the backrest 22 of the passenger seat 12 rearward. In other words, an example of the heat transfer part in this case may be the seat part 20, of each of the front seats, containing the front seat heater, and an example of the obstacle in this case may be the backrest 22 of each of the front seats.

Figure 2:
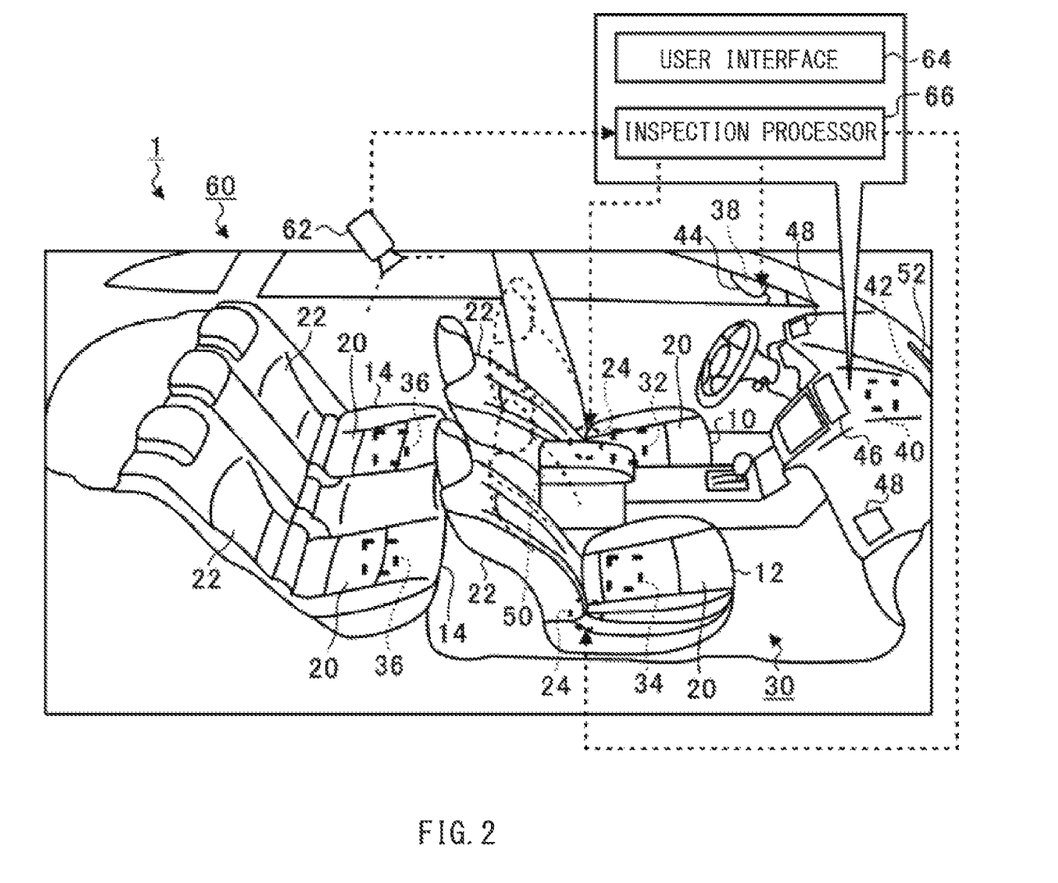
FIG. 2 is a schematic diagram illustrating an example in which a backrest of a driver's seat and a backrest of a passenger seat are tilted rearward.

FIG. 2 is a schematic diagram illustrating an example in which the backrest 22 of the driver's seat 10 and the backrest 22 of the passenger seat 12 are tilted rearward. As illustrated in FIG. 2, by being tilted rearward, the backrest 22 of each of the front seats may be caused to retreat from the state of being positioned between the thermal camera 62 and the seat part 20 of the front seat. This enables the thermal camera 62 to directly image the seat part 20, of the front seat, containing the front seat heater. Consequently, it is possible for the inspection processor 66 to more accurately acquire a temperature of the seat part 20 increased by the front seat heater, thus being able to more accurately determine the pass/fail of the front seat heater.

In addition, the inspection processor 66 may cause, as the modification process, the heat transfer part to be moved to be able to be imaged by the thermal camera 62.

In one example, if the side mirror 44 is in a closed state with respect to the vehicle body, the imaging of the side mirror 44 containing the side mirror heater 38 can be obstructed. Hence, the inspection processor 66 may cause the actuator of the side mirror 44 to put the side mirror 44 into an open state with respect to the vehicle body. In other words, an example of the heat transfer part in this case may be the side mirror 44 containing the side mirror heater 38.

If the side mirror 44 is opened with respect to the vehicle body, it becomes easier for the thermal camera 62 to image the side mirror 44. Consequently, it is possible for the inspection processor 66 to more accurately acquire a temperature of the side mirror 44 increased by the side mirror heater 38, thus being able to more accurately determine the pass/fail of the side mirror heater 38.

Figure 3:
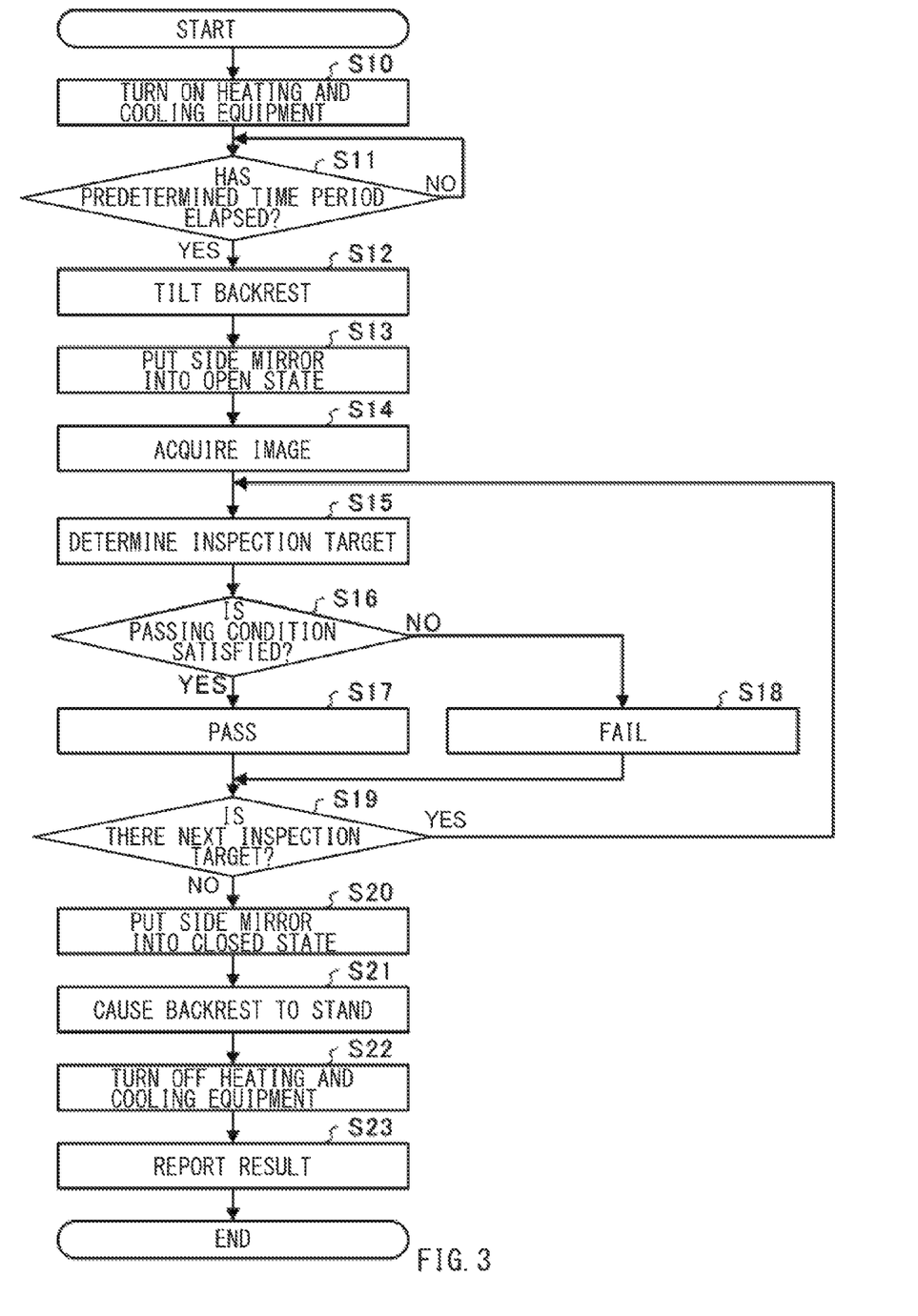
FIG. 3 is a flowchart illustrating a flow of operation of an inspection processor according to one example embodiment.

FIG. 3 is a flowchart illustrating a flow of operation of the inspection processor 66 according to the first example embodiment. Upon being instructed to start the inspection, the inspection processor 66 may first turn on all of the inspection-target-candidate heating and cooling equipment 30 (S10). Thus, of the heating and cooling equipment 30, temperature may increase for the heating equipment, and temperature may decrease for the cooling equipment.

Thereafter, the inspection processor 66 may wait until a predetermined time period elapses after turning on the heating and cooling equipment 30 (NO in S11). The predetermined time period may be set in consideration of temperature increase speed of the heating equipment and temperature decrease speed of the cooling equipment.

Another inspection process may be performed until the predetermined time period elapses after turning on the heating and cooling equipment 30. In other words, before performing the other inspection process, the heating and cooling equipment 30 may be turned on in advance, for subsequent inspection of the heating and cooling equipment 30.

The temperature increase speed or temperature decrease speed may differ depending on type of the heating and cooling equipment 30. With this point taken into consideration, the inspection processor 66 may turn on, at later timing, the heating and cooling equipment 30 whose temperature increase speed or temperature decrease speed is faster. In this case, it is possible to match timings at which target temperatures are reached, regardless of the temperature increase speed or temperature decrease speed.

If the predetermined time period elapses after turning on the heating and cooling equipment 30 (YES in S11), the inspection processor 66 may tilt, via the actuator 24, the backrest 22 of each of the front seats rearward (S12). Thereafter, the inspection processor 66 may cause the side mirror 44 to be put into an open state (S13). Thereafter, the inspection processor 66 may acquire an image from the thermal camera 62 (S14).

Thereafter, the inspection processor 66 may determine an inspection target out of the plurality of pieces of heating and cooling equipment 30 (S15). Thereafter, the inspection processor 66 may determine whether the acquired image satisfies a passing condition for a piece of the heating and cooling equipment 30 determined as the inspection target (S16).

The passing condition may be set in advance for each piece of the heating and cooling equipment 30. For example, the type of the heating and cooling equipment 30, a predetermined pixel position in an image, and a predetermined temperature threshold may be set in association with each other in advance. For example, the driver's seat heater 32, a predetermined pixel position, in an image, in a region where the seat part 20 of the driver's seat 10 is to be imaged, and a predetermined heat temperature threshold of the driver's seat heater 32 may be associated with each other. If a temperature at the predetermined pixel position corresponding to the driver's seat heater 32 is equal to or greater than the predetermined heat temperature threshold of the driver's seat heater 32, the inspection processor 66 may determine that the passing condition for the driver's seat heater 32 is satisfied. Note that the predetermined pixel position may be set at a plurality of places, in the image, in the region where the heat transfer part of the heating and cooling equipment 30 is to be imaged. In that case, the inspection processor 66 may determine that the passing condition is satisfied it at all of the plurality of places, the temperature at each pixel position is equal to or greater than the predetermined heat temperature threshold.

In a case of causing the air conditioner 40 to blow cool air, the inspection processor 66 may determine that the passing condition for the air conditioner 40 is satisfied, if the temperature at the pixel position corresponding to the heat transfer part of the air conditioner 40 is equal to or less than a predetermined cool temperature threshold of the air conditioner 40.

If the passing condition for the piece of heating and cooling equipment 30 to be inspected is satisfied (YES in S16), the inspection processor 66 may determine that the piece of heating and cooling equipment 30 to be inspected passes (S17). If the passing condition for the piece of heating and cooling equipment 30 to be inspected is not satisfied (NO in S16), the inspection processor 66 may determine that the piece of heating and cooling equipment 30 to be inspected fails (S18).

After the determination of pass or fail, the inspection processor 66 may determine whether the next inspection target is present (S19). If the next inspection target is present (YES in S19), the inspection processor 66 may cause the process to return to step S15, and determine the next inspection target (S15). By repeating this, the inspection processor 66 may perform the determination of pass or fail for all the inspection targets.

If the determination of pass or fail is completed for all the inspection targets (NO in S19), the inspection processor 66 may cause the side mirror 44 to be put into a closed state (S20). Thereafter, the inspection processor 66 may cause the backrest 22 of each of the front seats to stand (S21). Thereafter, the inspection processor 66 may turn off all of the heating and cooling equipment 30 (S22). Thereafter, the inspection processor 66 may cause the user interface 64 to report a pass or fail determination result (S23), and end the series of processes.

As described above, the inspection processor 66 of the inspection system 60 according to the first example embodiment causes the heating and cooling equipment 30 to start the operation, and executes the operation check inspection of determining whether the heating and cooling equipment 30 normally operates, on the basis of the image of the heat transfer part of the heating and cooling equipment 30 captured by the thermal camera 62. In executing the operation check inspection, the inspection processor 66 performs the modification process of modifying the imaging state to enable the heat transfer part to be imaged by the thermal camera 62.

Consequently, the inspection system 60 according to the first example embodiment makes it possible to easily perform the inspection of the vehicle-mounted heating and cooling equipment 30.

The inspection processor 66 may cause, as the modification process, the obstacle between the thermal camera 62 and the heat transfer part to be moved in the direction that prevents the imaging by the thermal camera 62 from being obstructed. Therefore, the inspection system 60 according to the first example embodiment makes it possible to more reliably execute the inspection based on the image captured by the thermal camera 62.

The inspection processor 66 may cause the backrest 22 to be tilted after waiting until immediately before acquiring the image. Thus, at timing of another inspection process prior to the inspection process for the heating and cooling equipment 30, it is possible to give, in advance, only an instruction to start the inspection of the heating and cooling equipment 30.

This makes it possible to, for example, perform the other inspection process prior to the inspection process for the heating and cooling equipment 30 in a normal state in which the backrest 22 is standing. It is also possible to make the temperature of the heat transfer part of the heating and cooling equipment 30 reach the target temperature during the other inspection process, which makes it possible to efficiently proceed the inspection process. In addition, because the backrest 22 is standing, it is possible to drive and move the vehicle 1 to a place of the next inspection process.

Note that, upon being instructed to start the inspection of the heating and cooling equipment 30, the inspection processor 66 may immediately cause the backrest 22 to be tilted, without waiting for the elapse of the predetermined time period.

The above description assumes that an imaging direction of the thermal camera 62 is fixed. In another example, an actuator configured to change the imaging direction of the thermal camera 62 may be provided. The inspection processor 66 may cause, as the modification process, an orientation of the thermal camera 62 to be changed to make the heat transfer part fall within an imaging range of the thermal camera 62. In this example, it is possible to reliably perform inspection even for the heating and cooling equipment 30 of which the heat transfer part is present outside a range of the field of view of the thermal camera 62.

The inspection processor 66 may acquire outside temperature, and change the predetermined time period to wait before causing the backrest 22 to be tilted after turning on the heating and cooling equipment 30, on the basis of the outside temperature. For example, it takes time for the temperature increase of the heat transfer part in a case where the outside temperature is low. Therefore, the predetermined time period in a case where the outside temperature is low may be made longer than the predetermined time period in a case where the outside temperature is high.

The inspection processor 66 may change the predetermined temperature threshold of the passing condition, on the basis of the outside temperature. For example, it is difficult for the temperature of the heat transfer part to increase in a case where the outside temperature is low. Therefore, the predetermined heat temperature threshold in a case where the outside temperature is low may be made lower than the predetermined heat temperature threshold in a case where the outside temperature is high.

[Second Example Embodiment]

Figure 4:
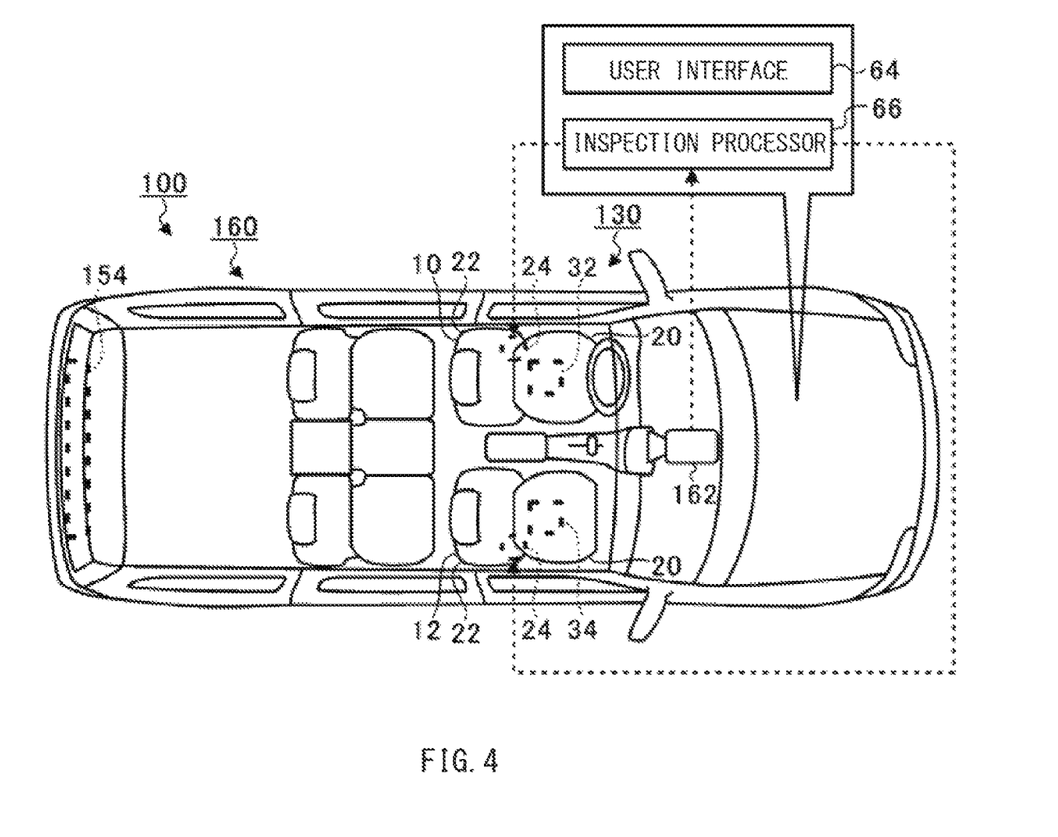
FIG. 4 is a schematic diagram illustrating a configuration of a vehicle according to one example embodiment.

FIG. 4 is a schematic diagram illustrating a configuration of a vehicle 100 according to a second example embodiment. The thermal camera 62 of the inspection system 60 according to the first example embodiment may be positioned above the rear seats 14. In contrast, a thermal camera 162 of an inspection system 160 according to the second example embodiment may be positioned above the front panel. The thermal camera 162 may be disposed in the middle in the left-right direction of the vehicle 100. In other words, the thermal camera 162 may be disposed near a rear-view mirror. The thermal camera 162 may face rearward. The thermal camera 162 may be provided, for example, in a housing of a monitoring system that monitors a state of a driver. In a case where a camera of the monitoring system is configured to serve as the thermal camera 162, the camera of the monitoring system may be used as the thermal camera 162 of the inspection system 160. The thermal camera 162 may perform imaging of a heat transfer part of heating and cooling equipment 130.

Examples of the heating and cooling equipment 130 according to the second example embodiment may be the driver's seat heater 32, the passenger seat heater 34, and a defogger 154. The defogger 154 may be provided on a rear windshield. The defogger 154 may heat the rear windshield to defog the rear windshield. Accordingly, the rear windshield may be a heat transfer part to which heat of the defogger 154 is to be transferred.

The thermal camera 162 being positioned above the front panel makes it possible to reliably image the seat part 20, of each of the front seats, containing the front seat heater. Therefore, the inspection system 160 according to the second example embodiment makes it possible to perform determination of pass/fail of the front seat heater more easily.

The backrest 22 of the driver's seat 10 and the backrest 22 of the passenger seat 12 can obstruct the imaging of the heat transfer part of the defogger 154 by the thermal camera 162. Hence, the inspection processor 66 may cause the backrest 22 of each of the front seats to be tilted, before acquiring an image captured by the thermal camera 162. Therefore, the inspection system 160 according to the second example embodiment makes it possible to perform inspection of the defogger 154 more reliably.

Consequently, the inspection system 160 according to the second example embodiment makes it possible to easily perform inspection of the vehicle-mounted heating and cooling equipment 130, as with the first example embodiment.

Although some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the thermal camera 62 according to the first example embodiment and the thermal camera 162 according to the second example embodiment may both be provided. In this example, the number of thermal cameras increases, which makes it possible to perform imaging of heating and cooling equipment at various positions, which helps to increase inspection targets of the operation check inspection.

Furthermore, the technology encompasses any possible combination of some or all of the various embodiments and the modifications described herein and incorporated herein. It is possible to achieve at least the following configurations from the above-described example embodiments of the technology.

(1)
An inspection system including:
a thermal camera mountable on a vehicle and configured to perform imaging of a heat transfer part of heating and cooling equipment mounted on the vehicle; and
an inspection processor configured to execute, after causing the heating and cooling equipment to start operation, operation check inspection of determining whether the heating and cooling equipment normally operates on the basis of an image of the heat transfer part obtained by the imaging by the thermal camera, and to, in executing the operation check inspection, perform a modification process of modifying an imaging state of the thermal camera to enable the heat transfer part to be imaged by the thermal camera.

(2)
The inspection system according to (1), in which the thermal camera is positioned above a rear seat of the vehicle.

(3)
The inspection system according to (1) or (2), in which the inspection processor is configured to perform, as the modification process, a process of causing an obstacle positioned between the thermal camera and the heat transfer part to be moved in a direction that prevents the imaging of the heat transfer part by the thermal camera from being obstructed.

(4)
The inspection system according to (3), in which a front seat of the vehicle contains a front seat heater, the heat transfer part includes a seat part of the front seat, and the obstacle includes a backrest of the front seat.

(5)
The inspection system according to (1) or (2), in which the inspection processor is configured to perform, as the modification process, a process of causing the heat transfer part to be moved to enable the heat transfer part to be imaged by the thermal camera.

(6)
The inspection system according to (5), in which a side mirror of the vehicle contains a side mirror heater, the heat transfer part includes the side mirror, and the inspection processor is configured to perform, as the modification process, a process of causing the side mirror to be put into an open state with respect to a body of the vehicle.

(7)
The inspection system according to (1) or (2), in which the inspection processor is configured to perform, as the modification process, a process of causing an orientation of the thermal camera to be changed to make the heat transfer part fall within an imaging range of the thermal camera.

The inspection processor 66 illustrated in FIGS. 1, 2, and 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the inspection processor 66. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the inspection processor 66 illustrated in FIGS. 1, 2, and 4.

What is claimed is:
1. An inspection system comprising:
a thermal camera that is mounted on a vehicle and that obtains an image of a heat transfer part of heating and cooling equipment mounted on the vehicle; and
an inspection processor configured to execute, after causing the heating and cooling equipment to start operation, operation check inspection of determining whether the heating and cooling equipment operates in a normal state based on the obtained image of the heat transfer part,
wherein when an obstacle is detected between the thermal camera and the heat transfer part such that the obstacle obstructs the thermal camera's view of the heat transfer part while executing the operation check inspection, the inspection processor moves the obstacle without moving a position of the heat transfer part or a position of the thermal camera such that the obstacle no longer obstructs the thermal camera's view of the heat transfer part.

2. The inspection system according to claim 1, wherein the thermal camera is positioned above a rear seat of the vehicle, and wherein when the heat transfer part is mounted on a front seat of the vehicle and the detected obstacle is a backrest of the front seat, the inspection processor moves the backrest of the front seat to allow the thermal camera positioned above the rear seat to capture an image of the heat transfer part mounted on the front seat.

3. The inspection system according to claim 1, wherein a front seat of the vehicle contains a front seat heater, the heating and cooling equipment comprises the front seat heater, the heat transfer part comprises a seat part of the front seat heated by the front seat heater when the front seat heater is in operation, and the obstacle comprises a backrest of the front seat.

4. An inspection system for a vehicle, the vehicle comprising a side mirror equipped with a side mirror heater, the inspection system comprising:

a thermal camera that is mounted on a vehicle, wherein the thermal camera obtains an image of a part of the side mirror heated by the side mirror heater; and an inspection processor configured to execute, after causing the side mirror heater to start heating the side mirror, operation check inspection of determining whether the side mirror heater operates in a normal state based on the obtained image of the heated part of the side mirror, wherein when the side mirror is folded in towards a vehicle body such that a part of the vehicle body is detected between the thermal camera and the heated part of the side mirror and obstructs the thermal camera's view of the heated part of the side mirror while executing the operation check inspection, the inspection processor controls a side mirror actuator to move the side mirror to fold out away from the vehicle body such that the part of the vehicle body no longer obstructs the thermal camera's view of the heated part of the side mirror.

5. The inspection system according to claim 1, wherein the thermal camera is positioned above a rear seat of the vehicle to capture an image of the rear seat to prevent a child left behind in the vehicle when the operation check inspection by the inspection processor is suspended.

6. The inspection system according to claim 1, wherein the thermal camera is disposed at a position of a center room lamp on a ceiling of the vehicle or at a position of a side room lamp disposed above a rear door.

* * * * *